United States Patent
Menon et al.

(10) Patent No.: US 10,616,846 B2
(45) Date of Patent: Apr. 7, 2020

(54) RASTER OFFSET PREDICTION FOR IMPROVED ACQUISITION PERFORMANCE IN NB-IOT

(71) Applicant: QUALCOMM Incorporated, San Diego, CA (US)

(72) Inventors: Srikanth Menon, Hyderabad (IN); Raghavendra Shyam Ananda, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/019,174

(22) Filed: Jun. 26, 2018

(65) Prior Publication Data

US 2019/0394740 A1  Dec. 26, 2019

(51) Int. Cl.
*H04W 56/00* (2009.01)
*H04L 29/08* (2006.01)

(52) U.S. Cl.
CPC ......... *H04W 56/0035* (2013.01); *H04L 67/12* (2013.01); *H04W 56/001* (2013.01); *H04W 56/003* (2013.01)

(58) Field of Classification Search
CPC ............................................. H04W 56/0036
USPC ........................................................ 370/550
See application file for complete search history.

(56) References Cited

U.S. PATENT DOCUMENTS

| | | | | |
|---|---|---|---|---|
| 9,866,368 | B1* | 1/2018 | Patel | H04L 5/0007 |
| 2002/0141482 | A1* | 10/2002 | Agami | H04L 7/0029 |
| | | | | 375/147 |
| 2005/0286661 | A1* | 12/2005 | Kwak | H04B 1/7085 |
| | | | | 375/343 |
| 2013/0070750 | A1* | 3/2013 | Kim | H04W 56/0035 |
| | | | | 370/350 |
| 2015/0139190 | A1* | 5/2015 | Patel | H04W 36/0094 |
| | | | | 370/331 |
| 2017/0118731 | A1* | 4/2017 | Lee | H04L 43/0864 |
| 2017/0367069 | A1* | 12/2017 | Agiwal | H04B 7/0695 |
| 2018/0295581 | A1* | 10/2018 | Krishnamoorthy | ........................ H04W 52/0241 |
| 2018/0376405 | A1* | 12/2018 | Han | H04J 11/0073 |

FOREIGN PATENT DOCUMENTS

WO   WO-2017136003 A1   8/2017

OTHER PUBLICATIONS

Wang, et. al., A Primer on 3GPP Narrowband Internet of Things (NB-IoT) (Year: 2017).*
Ali A., et al., "On the Cell Search and Initial Synchronization for NB-IoT LTE Systems", IEEE Communication Letters, IEEE Service Center, Piscataway, NJ, US, vol. 21, No. 8, Aug. 1, 2017, XP011658646, ISSN: 1089-7798, DOI: 10.1109/LCOMM.2017.2700864, [retrieved on Aug. 10, 2017], cols. 1-7, figure 2, pp. 1843-1846.

(Continued)

*Primary Examiner* — Peter G Solinsky
(74) *Attorney, Agent, or Firm* — Norton Rose Fulbright LLP

(57) ABSTRACT

Disclosed is a method and apparatus for reducing timing drift where a UE computes an NSSS based timing error using a cross correlation. Next, timing drift is measured as the difference in timing error at two NSSS instances separated by a time duration. The timing drift value can then be mapped to a raster offset.

30 Claims, 11 Drawing Sheets

(56) References Cited

OTHER PUBLICATIONS

International Search Report and Written Opinion—PCT/US2019/035425—ISA/EPO—dated Sep. 24, 2019.
Qualcomm Incorporated: "NB-PSS and NB-SSS Design", 3GPP Draft; R1-161936, NB-PSS and NB-SSS Design, 3rd Generation Partnership Project (3GPP), Mobile Competence Centre; 650, Route Des Lucioles; F-06921 Sophia-Antipolis Cedex; France, vol. RAN WG1, No. Sophia Antipolis, France: Mar. 22, 2016-Mar. 24, 2016 Mar. 16, 2016, XP051081052, Retrieved from the Internet: URL:http://www.3gpp.org/ftp/tsg_ran/WG1_RL1/TSGR1_AH/LTE_NB-IoT_1603/Docs/ [retrieved on Mar. 16, 2016], p. 1, line 1-p. 13, line, 23 pages.

* cited by examiner

RASTER OFFSET PREDICTION FOR IMPROVED ACQUISITION PERFORMANCE IN NB-IOT

INTRODUCTION

The following relates generally to raster offset.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

SUMMARY

A method, and apparatus for reducing timing drift in a narrowband Internet-of-Things (NB-IoT) system is described. The method, and apparatus comprise at least one user equipment tracking a timing error using a NSSS signal. The UE then computes an NSSS based time error estimate. In addition, the UE then estimates a timing drift using the NSSS based time error estimate.

In another example, the step of the UE computing the NSSS based timing error further comprises using a cross correlation operation on the NSSS samples every time duration T.

In still another example, the step of estimating a timing drift using the NSSS based time error estimate further comprises taking a difference in timing error from at least two NSSS instances separated by the time duration T, and dividing the difference in timing error by the time duration T, wherein time duration T is a periodicity of the NSSS.

In another example, the method and apparatus further comprises mapping the estimated timing drift to a raster offset.

In still another example, the time duration T is a periodicity of the NSSS.

In another example, the step of mapping the estimated timing drift to a raster offset further comprises finding a drift value corresponding to one or more possible values of raster offset closest to the estimated timing drift value by using a minimum distance criterion, comparing the estimated timing drift value to the drift values corresponding to one or more possible values of raster offset, and choosing the raster offset which has a corresponding drift value closest to the estimated timing drift.

In still another example, the raster offset is corrected.

DETAILED DESCRIPTION

Figure 1:
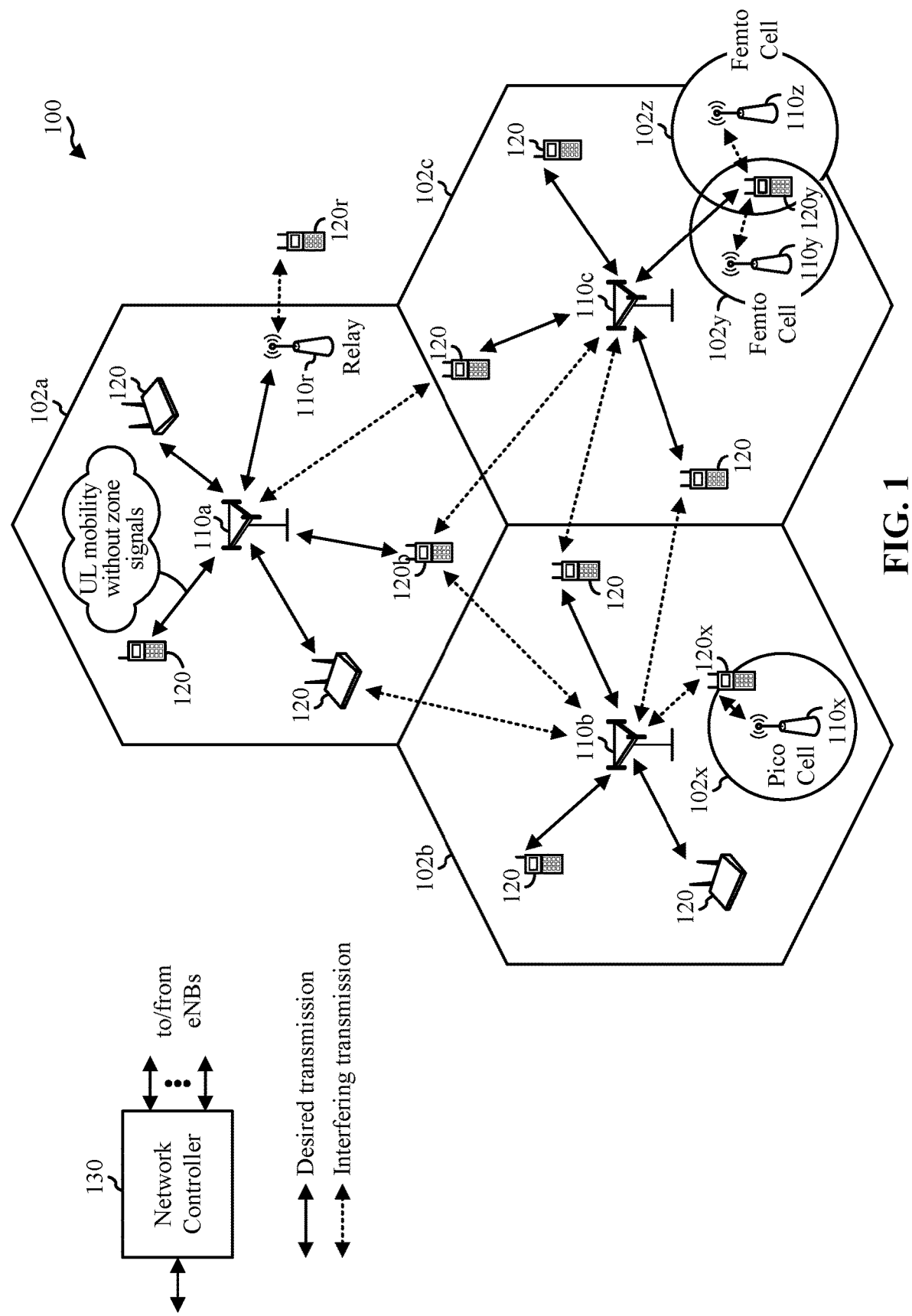
FIG. 1 is a block diagram conceptually illustrating an example telecommunications system, in accordance with certain aspects of the present disclosure.

With 5G NR, subcarrier spacing may be scaled. Also, the waveforms selected for 5G include cyclic prefix-orthogonal frequency-division multiplexing (CP-OFDM) and DFT-Spread (DFT-S) OFDM, In addition, 5G allows for switching between both CP OFDM and DFT-S-OFDM on the uplink to get the MIMO spatial multiplexing benefit of CP-OFDM and the link budget benefit of DFT-S OFDM, With LTE, orthogonal frequency-division multiple access (OFDMA) communications signals may be used for downlink communications, while Single-Carrier Frequency-Division Multiple Access (SC-FDMA) communications signals may be used for LTE uplink communications. The DFT-s-OFDMA scheme spreads a plurality of data symbols (i.e., a data symbol sequence) over a frequency domain which is different from the OFDMA scheme. Also, in comparison to the OFDMA scheme, the DFT-s-OFDMA scheme can greatly reduce a PAPR of a transmission signal. The DFT-s-OFDMA scheme may also be referred to as an SC-FDMA scheme.

Scalable OFDM multi-tone numerology is another feature of 5G. Prior versions of LTE supported a mostly fixed OFDM numerology of 15 kHz spacing between OFDM tones (often called subcarriers) and carrier bandwidths up to 20 MHz. Scalable OFDM numerology has been introduced in 5G to support diverse spectrum bands/types and deployment models. For example, 5G NR is able to operate in mmWave bands that have wider channel widths (e.g., 100s of MHz) than currently in use in LTE. Also, the OFDM subcarrier spacing is able to scale with the channel width, so the FFT size scales such that processing complexity does not increase unnecessarily for wider bandwidths. In the present application, numerology refers to the different values different features of a communication system can take such as subcarrier spacing, cyclic prefix, symbol length, FFT size, TTI, etc.

Also in 5G NR, cellular technologies have been expanded into the unlicensed spectrum, both stand-alone and licensed-assisted (LAA). In addition, the unlicensed spectrum may occupy frequencies up to 60 GHz also known as mmWave. The used of unlicensed bands provides added capacity.

A first member of this technology family is referred to as LTE Unlicensed or LTE-U. By aggregating LTE in unlicensed spectrum with an 'anchor' channel in licensed spectrum, faster downloads are enabled for customers. Also, LTE-U shares the unlicensed spectrum fairly with Wi-Fi. This is an advantage because in the 5 GHz unlicensed band where Wi-Fi devices are in wide use, it is desirable for LTE-U to coexist with the Wi-Fi. However, an LTE-U network may cause RF interference to an existing co-channel Wi-Fi device. Choosing a preferred operating channel and minimizing the interference caused to nearby Wi-Fi networks is a goal for LTE-U devices. However, the LTE-U single carrier (SC) device may operate on the same channel as Wi-Fi if all available channels are occupied by Wi-Fi devices. To coordinate spectrum access between LTE-U and Wi-Fi, the energy across the intended transmission band is first detected. This energy detection (ED) mechanism informs the device of ongoing transmissions by other nodes. Based on this ED information, a device decides if it should transmit. Wi-Fi devices do not back off to LTE-U unless its interference level is above an energy detection threshold (−62 dBm over 20 MHz). Thus, without proper coexistence mechanisms in place, LTE-U transmissions could cause considerable interference on a Wi-Fi network relative to Wi-Fi transmissions.

Licensed Assisted Access or LAA is another member of the unlicensed technology family. Like LTE-U, it also uses an anchor channel in licensed spectrum. However, it also adds "listen before talk" (LBT) to the LTE functionality.

A gating interval may be used to gain access to a channel of a shared spectrum. The gating interval may determine the application of a contention-based protocol such as an LBT protocol. The gating interval may indicate when a Clear Channel Assessment (CCA) is performed. Whether a channel of the shared unlicensed spectrum is available or in use is determined by the CCA. If the channel is "clear" for use, i.e., available, the gating interval may allow the transmitting apparatus to use the channel. Access to the channel is typically for a predefined transmission interval. Thus, with unlicensed spectrum, a "listen before talk" procedure is performed before transmitting a message. If the channel is not cleared for use, then a device will not transmit.

Another member of this family of unlicensed technologies is LTE-WLAN Aggregation or LWA which utilizes both LTE and Accounting for both channel conditions, can split a single data flow into two data flows which allows both the LTE and the Wi-Fi channel to be used for an application. Instead of competing with the LTE signal is using the WLAN connections seamlessly to increase capacity.

The final member of this family of unlicensed technologies is MulteFire. MuLTEfire opens up new opportunities by operating 4G LTE technology solely in unlicensed spectrum such as the global 5 GHz. Unlike LTE-U and LAA, MulteFire allows entities without any access to licensed spectrum. Thus, it operates in unlicensed spectrum on a standalone basis, that is, without any anchor channel in the licensed spectrum. Thus, MulteFire differs from LTE-U, LAA and DNA because they aggregate unlicensed spectrum with an anchor in licensed spectrum, Without relying on licensed spectrum as the anchoring service, MulteFire allows for like deployments. A MulteFire network may include access points (APs) and/or base stations 105 communicating in an unlicensed radio frequency spectrum band, e.g., without an licensed anchor carrier.

The (DRS Measurement Timing Configuration) is a technique that allows MulteFire to transmit but with minimal interference to other unlicensed technology including Wi-Fi. Additionally, the periodicity of discovery signals is very sparse. This allows Multefire to access channels occasionally, transmit discovery and control signals, and then vacate the channels. Since the unlicensed spectrum is shared with other radios of similar or dissimilar wireless technologies, a so-called listen-before-talk (LBT) method is applied for channel sensing. LBT involves sensing the medium for a pre-defined minimum amount of time and backing off if the channel is busy. Therefore, the initial random access (RA) procedure for standalone LTE-U should involve as few transmissions as possible and also have low latency, such that the number of LBT operations can be minimized and the RA procedure can then be completed as quickly as possible.

Leveraging a DMTC (DRS Measurement Timing Configuration) window, MulteFire algorithms search and decode reference signals in unlicensed band from neighboring base stations in order to know which base station would be best for serving the user. As the caller moves past one base station, their UE sends a measurement report to it, triggering a handover at the right moment, and transferring the caller (and all of their content and information) to the next base station.

Since LTE traditionally operated in licensed spectrum and Wi-Fi operated in unlicensed bands, coexistence with Wi-Fi or other unlicensed technology was not considered when LTE was designed. In moving to the unlicensed world, the LTE waveform was modified and algorithms were added in order to perform Listen Before Talk (LBT). This allows us to respect unlicensed incumbents including Wi-Fi by not just acquiring a channel and immediately transmitting. The present example supports LBT and the detection and transmission of WCUBS (Wi-Fi Channel Usage Beacon Signal) for ensuring coexistence with Wi-Fi neighbors.

MulteFire was designed to "hear" a neighboring Wi-Fi base station's transmission (because it's all unlicensed spectrum). MulteFire listens first, and autonomously makes the decision to transfer when there is no other neighboring Wi-Fi transmitting on the same channel. This technique ensures co-existence between MulteFire and Wi-Fi.

Additionally, we adhere to the unlicensed rules and regulations set by 3GPP and the European Telecommunications Standards Institute (ETSI), which mandates the −72 dBm LBT detection threshold. This further helps us de-conflict with Wi-Fi. MulteFire's LBT design is identical to the standards defined in 3GPP for LAA/eLAA and complies with ETSI rules.

An expanded functionality for 5G involves the use of 5G NR Spectrum Sharing, or INS.-SS. 5G spectrum sharing enables enhancement, expansion, and upgrade of the spectrum sharing technologies introduced in LTE. These include LTE Wi-Fi Aggregation (LWA), License Assisted Access (LAA), enhanced License Assisted Access (eLAA), and CBRS/License Shared Access (LSA).

Aspects of the disclosure are initially described in the context of a wireless communication system. Aspects of the disclosure are then illustrated by and described with reference to apparatus diagrams, system diagrams, and flowcharts that relate to receiving on transmit and transmitting on receive.

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities.

A BS 110 may be a station that communicates with UEs 120. Each BS 110 may provide communication coverage for a particular geographic area. In 3 GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, 5G Radio NodeB (gNB), or TRP may be interchangeable. In some examples, a cell may not necessarily be stationary, and the geographic area of the cell may move according to the location of a mobile base station 120. In some examples, the base stations 110 may be interconnected to one another and/or to one or more other base stations 110 or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS 110 may provide communication coverage for a macro cell, a pico cell, a femto cell, and/or other types of cell. A macro cell may cover a relatively large geographic area (e.g., several kilometers in radius) and may allow unrestricted access by UEs 120 with service subscription. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs in a Closed Subscriber Group (CSG), UEs for users in the home, etc.). A BS 110 for a macro cell may be referred to as a macro BS 110. A BS for a pico cell may be referred to as a pico BS. A BS for a femto cell may be referred to as a femto BS or a home BS. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BS for the femto cells 102*y* and 102*z*, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110*r* may communicate with the BS 110*a* and a UE 120*r* in order to facilitate communication between the BS 110*a* and the UE 120*r*. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120*x*, 120*y*, etc.) may be dispersed throughout the wireless network 100, and each UE may be stationary or mobile. A UE 120 may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices. In NB IoT, the UL and DL have higher periodicities and repetitions interval values as a UE decodes data in extended coverage.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 5A and 5B. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the sole entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP), or gNB) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
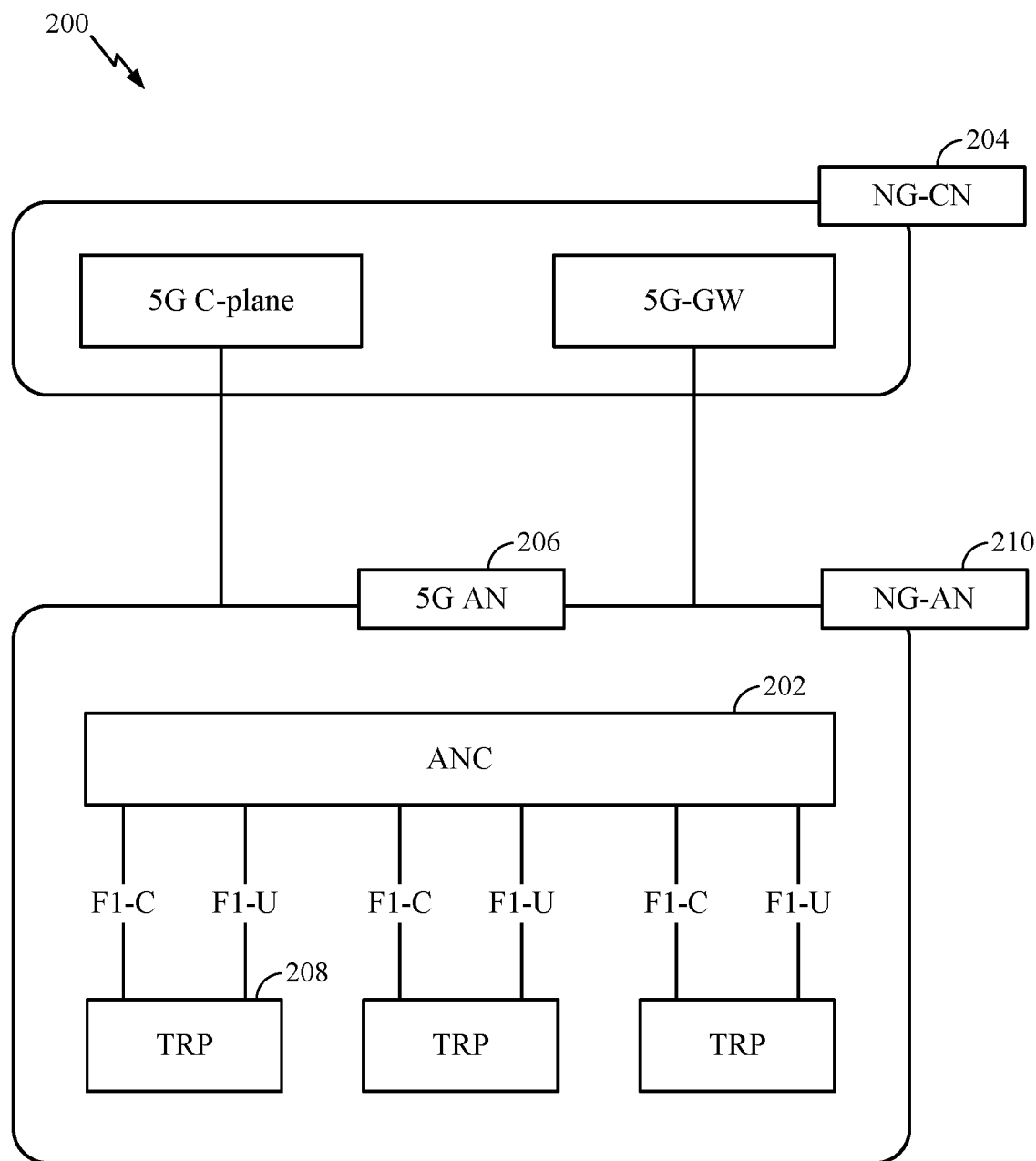
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, eNB, gNB, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
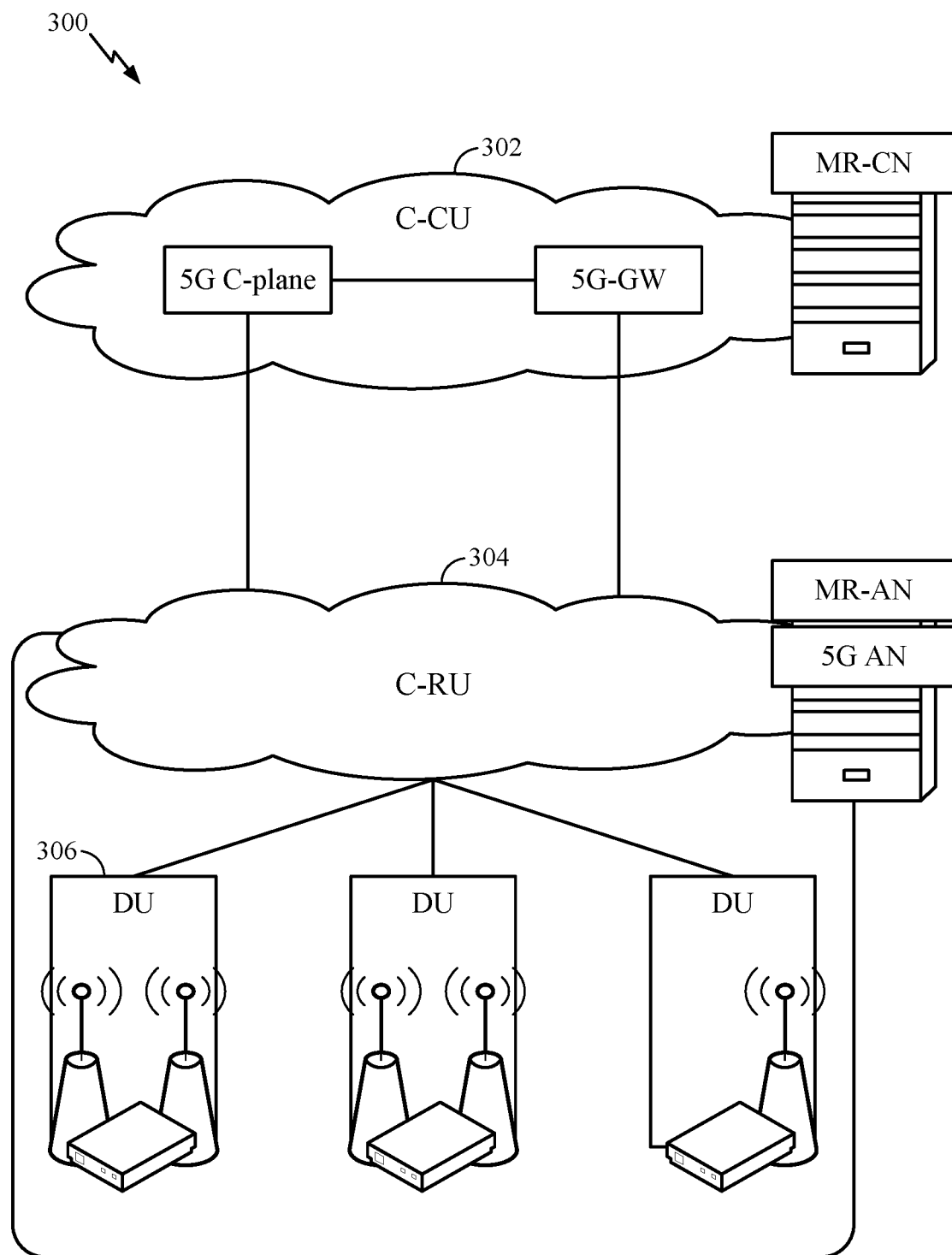
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
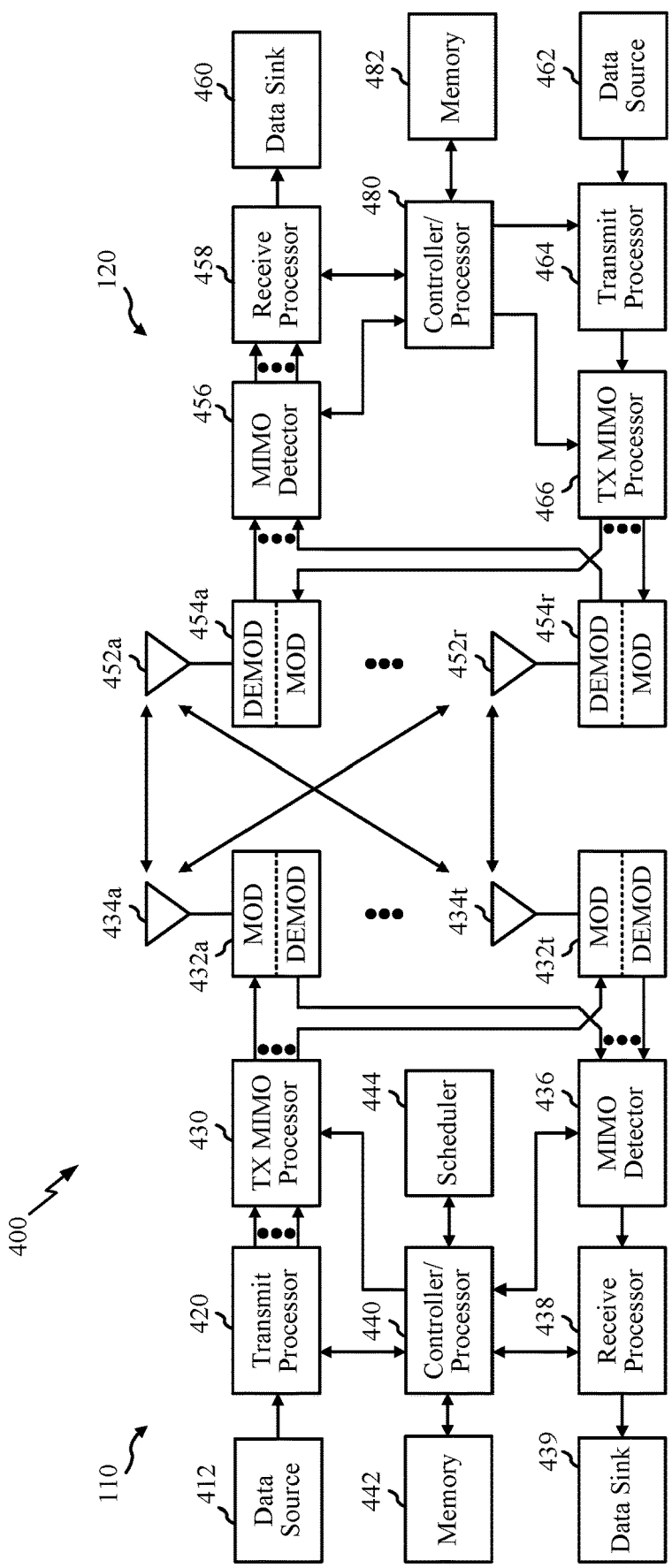
FIG. 4 is a block diagram conceptually illustrating a design of an example base station (BS) and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, processors 466, 458, 464, and/or controller/processor 480 of the UE 120 and/or antennas 434, processors 460, 420, 438, and/or controller/processor 440 of the BS 110 may be used to perform the operations described herein.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5A:
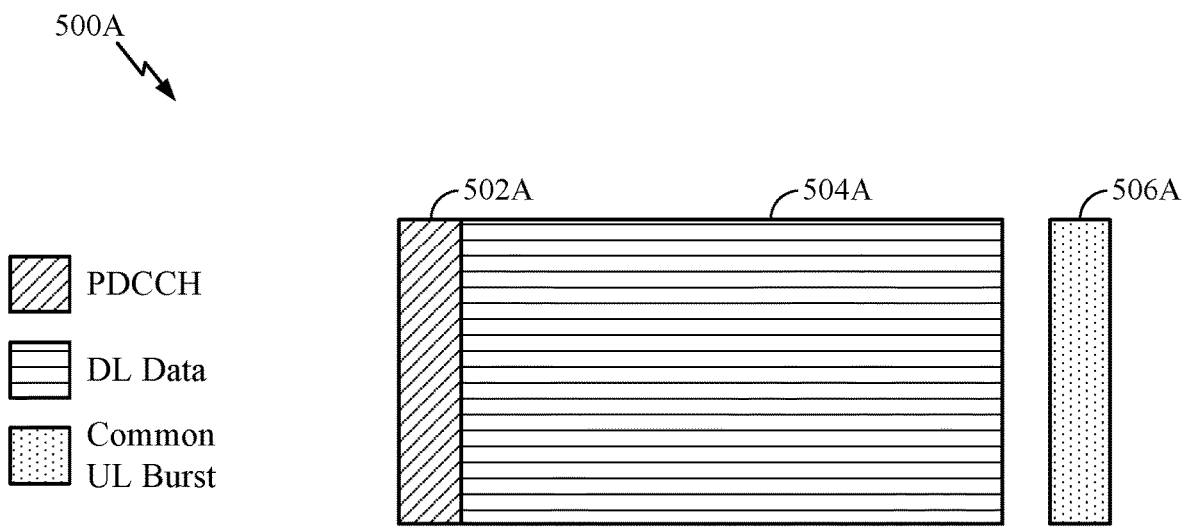
FIG. 5A is a diagram illustrating an example of a downlink (DL)-centric subframe according to some aspects of the present disclosure.

FIG. 5A is a diagram 500A showing an example of a DL-centric subframe. The DL-centric subframe may include a control portion 502A. The control portion 502A may exist in the initial or beginning portion of the DL-centric subframe. The control portion 502A may include various scheduling information and/or control information corresponding to various portions of the DL-centric subframe. In some configurations, the control portion 502A may be a physical DL control channel (PDCCH), as indicated in FIG. 5A. The DL-centric subframe may also include a DL data portion 504A. The DL data portion 504A may sometimes be referred to as the payload of the DL-centric subframe. The DL data portion 504A may include the communication resources utilized to communicate DL data from the scheduling entity 202 (e.g., eNB, BS, Node B, 5G NB, TRP, gNB, etc.) to the subordinate entity, e.g., UE 120. In some configurations, the DL data portion 504A may be a physical DL shared channel (PDSCH). The DL-centric subframe may also include a common UL portion 506A. The common UL portion 506A may sometimes be referred to as an UL burst, a common UL burst, and/or various other suitable terms. The common UL portion 506A may include feedback information corresponding to various other portions of the DL-centric subframe. For example, the common UL portion 506 may include feedback information corresponding to the control portion 502A. Non-limiting examples of feedback information may include an ACK signal, a NACK signal, a HARQ indicator, and/or various other suitable types of information. The common UL portion 506A may include additional or alternative information, such as information pertaining to random access channel (RACH) procedures, scheduling requests (SRs), sounding reference signals (SRS) and various other suitable types of information. As illustrated in FIG. 5A, the end of the DL data portion 504A may be separated in time from the beginning of the common UL portion 506A. This time separation may sometimes be referred to as a gap, a guard period, a guard interval, and/or various other suitable terms. This separation provides time for the switchover from DL communication (e.g., reception operation by the subordinate entity, e.g., UE 120) to UL communication (e.g., transmission by the subordinate entity e.g., UE 120). One of ordinary skill in the art will understand, however, that the foregoing is merely one example of a DL-centric subframe and alternative structures having similar features may exist without necessarily deviating from the aspects described herein.

Figure 5B:
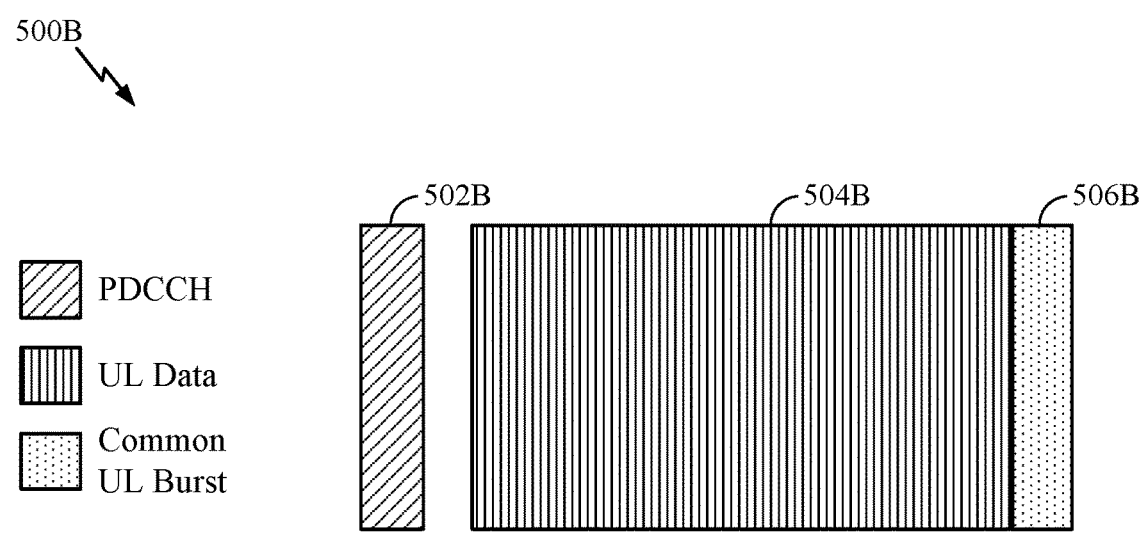
FIG. 5B is a diagram illustrating an example of an uplink (UL)-centric subframe according to some aspects of the present disclosure.

FIG. 5B is a diagram 500B showing an example of an UL-centric subframe.

The UL-centric subframe may include a control portion 502B. The control portion 502B may exist in the initial or beginning portion of the UL-centric subframe. The control portion 502B in FIG. 5B may be similar to the control portion 502A described above with reference to FIG. 5A. The UL-centric subframe may also include an UL data portion 504B. The UL data portion 504B may sometimes be referred to as the payload of the UL-centric subframe. The UL portion may refer to the communication resources utilized to communicate UL data from the subordinate entity, e.g., UE 120 to the scheduling entity 202 (e.g., eNB). In some configurations, the control portion 502B may be a physical UL shared channel (PUSCH). As illustrated in FIG. 5B, the end of the control portion 502B may be separated in time from the beginning of the UL data portion 504B. This time separation may sometimes be referred to as a gap, guard period, guard interval, and/or various other suitable terms. This separation provides time for the switchover from DL communication (e.g., reception operation by the scheduling entity 202) to UL communication (e.g., transmission by the scheduling entity 202). The UL-centric subframe may also include a common UL portion 506B. The common UL portion 506B in FIG. 5B may be similar to the common UL portion 506A described above with reference to FIG. 5A. The common UL portion 506B may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein. In summary, a UL centric subframe may be used for transmitting UL data from one or more mobile stations to a base station, and a DL centric subframe may be used for transmitting DL data from the base station to the one or more mobile stations. In one example, a frame may include both UL centric subframes and DL centric subframes. In this example, the ratio of UL centric subframes to DL subframes in a frame may be dynamically adjusted based on the amount of UL data and the amount of DL data that need to be transmitted. For example, if there is more UL data, then the ratio of UL centric subframes to DL subframes may be increased. Conversely, if there is more DL data, then the ratio of UL centric subframes to DL subframes may be decreased.

In an NB-IoT system, the initial cell search procedure is a prerequisite to establish a downlink communication link between a base station and a user terminal. Its main purpose is to achieve cell identification downlink and synchronization acquisition. Uses for NB-IoT include providing extended coverage for UEs deployed in environments with high penetration losses, e.g., basement of a building, and at the same time, being used in very low cost UEs. Low-cost crystal oscillators are included in the low cost UEs that can have an initial carrier frequency offset (CFO) as large as 20 ppm, i.e, where the output frequency is 20 ppm from the desired frequency. (ppm stands for parts per million, and how much a crystal's frequency may deviate from the nominal value is indicated by the ppm). An NB-Iot cell can have a raster offset from the standard 100 kHz spaced LTE cell raster locations. Raster offset is the difference in frequency between the carrier frequency and a 100 kHz raster frequency. The presence of raster offset can result in either under or over compensation of the frequency error. (The UE estimates the error of its frequency reference source, e.g., the local oscillator). As a result, depending on whether the frequency error was under or over compensated, the symbol timing drifts in either the backward or forward direction. A channel raster frequency of 100 kHz means that the carrier centre (or cell) frequency is an integer multiple of 100 kHz.

In NB IoT systems, a UE does a scan of the frequency band to detect NB IoT cells where it scans through all the possible frequencies. Raster offset can be one of (0, +2.5 kHz, −2.5 kHz, 7.5 kHz, −7.5 kHz) for cell acquisition. For example, deployment in-band and in guard-bands of LTE can introduce a raster offset (±2.5 or ±7.5 kHz) giving rise to an even higher frequency offsets in the center or carrier frequency.

Figure 6:
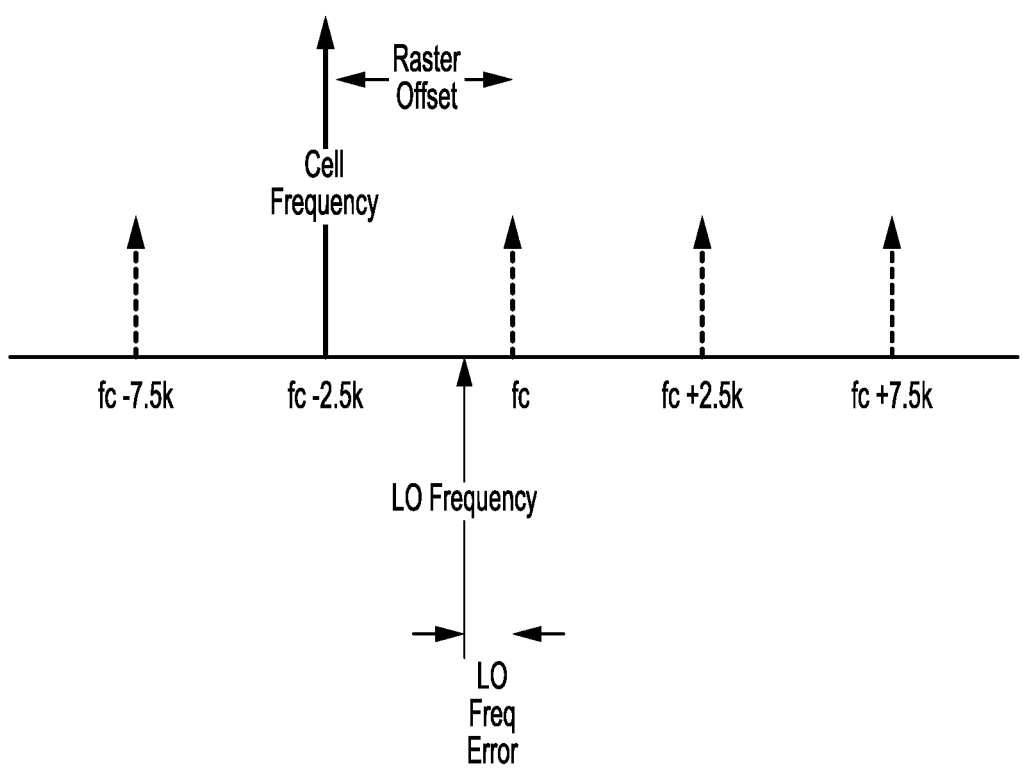
FIG. 6 shows a raster offset of 2.5 kHz from the carrier frequency fc and an LO frequency error less than 2.5 kHz.

Prior to decoding the narrowband physical broadcast channel (NPBCH), raster offset is unknown to the UE. However, it can be difficult to determine which part of the frequency offset is caused by the raster offset and which part is caused by the crystal or local oscillator. NPBCH, NPSS, and NSSS are used for master system information acquisition and initial synchronization. An NB-IoT UE uses NPSS and NSSS to perform cell search, which includes cell identity detection and frequency and time synchronization. The NPBCH is transmitted in subframe #0 in every frame and carries the master information block (MIB). Over the 640 ms transmission time interval (TTI) the MIB remains unchanged. The UE uses the frequency offset (assuming it's coming from the UE's own local oscillator (LO)) to correct frequency error. The UE also corrects timing drift coming from the raster offset. See FIG. 6 which shows a raster offset of 2.5 kHz from the carrier frequency fc and an LO frequency error less than 2.5 kHz. Timing drift is an artifact caused by frequency error of the clock source. Timing drift correction is part of the frequency offset compensation. However, since frequency offset has an unknown raster offset in it, we end up doing over/under compensation, and this causes higher drift. If raster offset is zero, the frequency error compensation would be correct and there will be no timing drift post frequency error compensation.

So to correct the frequency error, two corrections are made: i) the local oscillator (LO) frequency is corrected and 2) the timing drift is corrected. For example, residual crystal oscillator (XO) (or local oscillator (LO)) frequency error after a PSS/SSS search is of the order of 50 to 100 Hz, which would translate to 0.14 ppm frequency error in a worst case. The frequency offset is caused by the XO's inaccuracy. On the other hand, raster offset can add up to 10.7 ppm timing drift.

Due to the frequency offset, a timing drift can be caused in incoming samples. The ppm error will manifest as a timing drift for the UE. The following three equations can help explain this.

$$F_{ppm} = (f_{raster} + f_{error})/f_{carrier} \quad \text{Equation 1:}$$

$$F^{actual}_{ppm} = f_{error}/f_{carrier} \quad \text{Equation 2:}$$

$$F^{error}_{ppm} = f_{raster}/F_{carrier} \quad \text{Equation 3:}$$

In the first equation, the searcher is a block where the first signal is a raster offset signal $f_{raster}$ and the second signal is a frequency error $f_{error}$ signal from the local oscillator. The searcher block estimates a frequency error which is a sum of the $f_{raster}$ and $f_{error}$. (This result when divided by the carrier frequency $f_{carrier}$ yields a total frequency offset (or clock error) from the LO oscillator and the raster offset returned by the searcher in parts per million (ppm).

In equation 2, the true frequency error in ppm is the actual frequency error from the local oscillator $f_{error}$ divided by the carrier frequency $f_{carrier}$ to yield the frequency error $f_{error}$ signal from the local oscillator in ppm.

In equation 3, the additional frequency error introduced from the raster offset signal $f_{raster}$ is divided by the carrier frequency $f_{carrier}$ to yield the additional frequency error introduced by the raster offset in ppm.

TABLE A

| Carrier Frequency (Mhz) | Raster offset(Hz) | Drift (us per Second) |
|---|---|---|
| 700 | 0 | 0 |
| 900 | | 0 |
| 1800 | | 0 |
| 2500 | | 0 |
| 700 | 2500 | 3.571428571 |
| 900 | | 2.777777778 |
| 1800 | | 1.388888889 |
| 2500 | | 1 |
| 700 | 7500 | 10.71428571 |
| 900 | | 8.333333333 |
| 1800 | | 4.166666667 |
| 2500 | | 3 |

Figure 7:
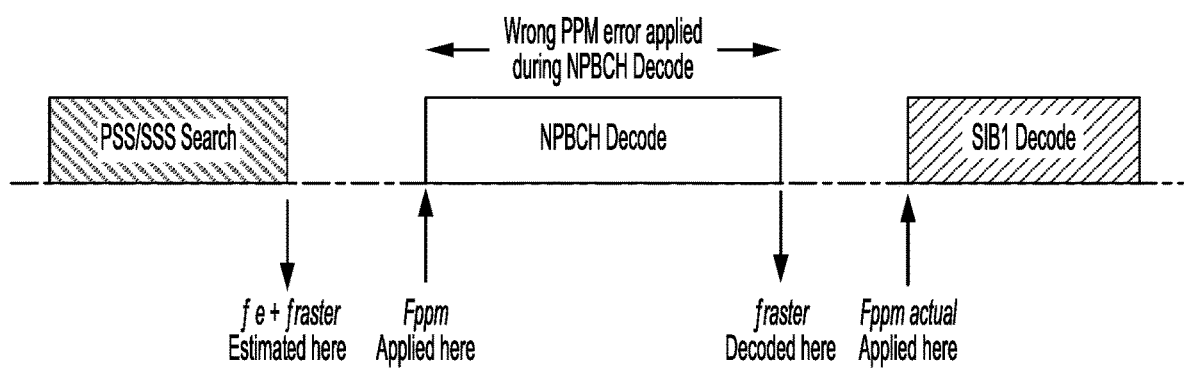
FIG. 7 is a timeline showing when a PSS/SSS search occurs, when a NPCH occurs and wen a SIB1 decode occurs.

As stated above, the raster offset can add up to 10.7 ppm timing drift. In the above table A, for a carrier frequency of 700 MHz, a raster offset of 7,500 Hz corresponds to a timing drift of 10.7 ppm. FIG. 7 is a timeline showing when a PSS/SSS search occurs, when a NPCH decode occurs and when a SIB1 decode occurs. In FIG. 7, $f_e$ and $f_{raster}$ are estimated at the end of a PSS/SSS search. A correction for $f_e$ and $f_{raster}$ in ppm is applied at the beginning of a NPBCH decode. A wrong frequency error in ppm may be applied during a NPBCH decode to compensate for the total frequency offset from the LO oscillator and the raster offset in parts per million (ppm) which induces additional timing drift. As a result, a degradation in detection of the NPBCH may occur, especially if the NPBCH is not detected on the first attempt. For example, an unsuccessful detection of NPBCH in the first attempt may introduce additional latency before attempting another NPBCH detection attempt. Hence, because of this latency, the NRS based method of decoding NPBCH cannot decode in a high rate of time drift due to raster offset in extreme coverage cases.

Figure 8:
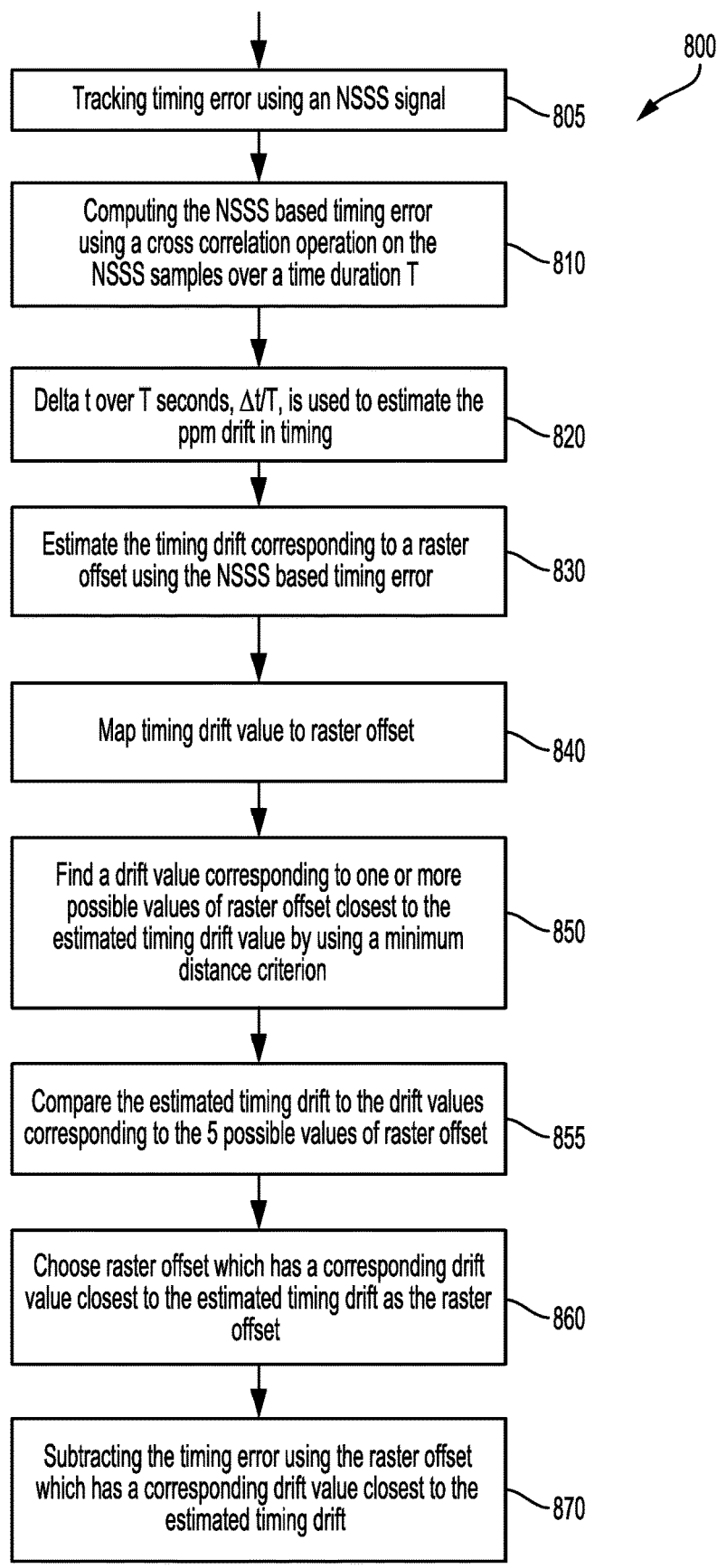
FIG. 8 is a flowchart showing the steps taken when predicting and correcting for time offset based raster offset.
Figure 9A:
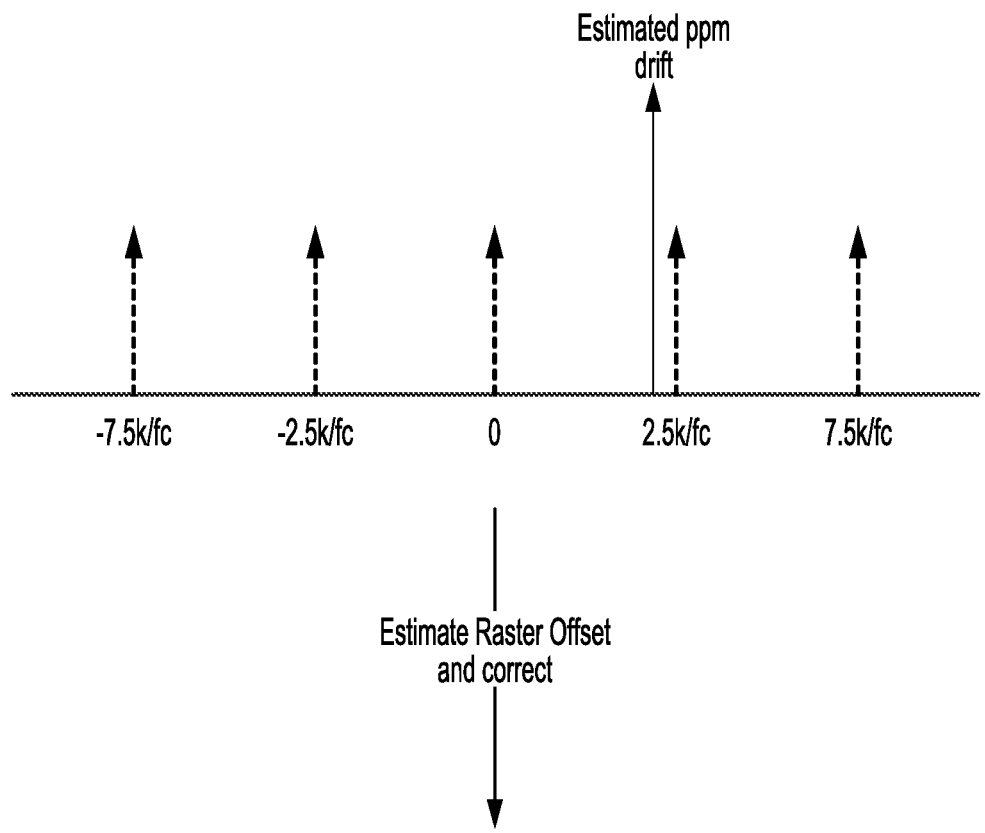
FIG. 9A discloses an estimated timing drift.

A NPBCH decode in a NB-IoT system may take up to 4TTIs (approximately 2 to 3 seconds) in extreme coverage scenarios. Since the narrowband reference signal (NRS) availability is limited during NPBCH decode, the UE's time tracking loop performance is, in extreme coverage, affected by this timing drift. The UE's time tracking loop uses long temporal filtering on narrowband reference signals (NRS) in low SNRs. However, the number of reference signals is limited and the decoding of NPBCH is affected by continuously increasing time error. Hence, the NRS based method alone cannot track a high rate of time drift due to raster offset in extreme coverage cases. (The NRS is used to provide phase reference for the demodulation of the downlink channels. NRSs are time and frequency multiplexed with information bearing symbols in subframes carrying NPBCH, NPDCCH and NPDSCH, using 8 resource elements per subframe per antenna port). In one example, the UE can reduce timing drift by correcting for one of the two sources of frequency errors, the raster offset. After a PSS/SSS search, a frequency error estimate is determined which has two error components: i) estimation error and ii) raster offset. The estimation error is small compared to the error caused by the raster offset. FIG. 8 is a flowchart of the steps taken when predicting and correcting for time offset based raster offset. FIG. 9A discloses an estimated timing drift. The UE tracks timing error using an NSSS signal. Step 805. The UE computes the NSSS based timing error using a cross correlation operation on the NSSS samples over time duration T=20 msec., where 20 msec. is the periodicity of the NSSS. See FIG. 8, step 810. That is, a differential time error between multiple NSSS samples is computed over a time duration T. In one example, the multiple samples are two samples. During this cross correlation, a timing error (in uSec) at multiple NSSS instances is measured or estimated using a sliding correlation on the NSSS samples. In one example, the time error will be measured at multiple time instances of 20 msec, when the NSSS is sampled. The timing error can be mapped to residual frequency error.

Timing drift is measured as the difference in timing error at two NSSS instances. separated by T, the periodicity of the NSSS which is 20 msec for a NSSS. So at a first NSSS sample, a timing error is measured. At a second NSSS samples 20 ms later, the timing error is measured. Then the difference in timing error between the two NSSS samples, delta t=Δt, is taken and then divided by T. That is, a differential time error, delta t (or Δt), is computed over a time duration T and then divided by the time duration T. Thus, delta t over T seconds, Δt/T, is used to estimate the ppm drift in timing. This yields a timing drift value in useconds/second or ppm which is the time based error estimate. Step 820. The UE can estimate the timing drift corresponding to a raster offset using the NSSS based timing error. See FIG. 8, step 830 and FIG. 9A.

The timing drift value can then be mapped to a raster offset. Step 840. In one example, the mapping involves finding a drift value corresponding to one or more possible values of raster offset closest to the estimated timing drift value by using a minimum distance criterion. FIG. 8, step 850. Then, the UE can compare the estimated timing drift to the drift values corresponding to the 5 possible values of raster offset shown in table A. See FIG. 8, step 855. The raster offset can be one of (0, +2.5 kHz, −2.5 kHz, 7.5 kHz, −7.5 kHz) for cell acquisition. The raster offset which has a corresponding drift value closest to the estimated timing drift is chosen as the raster offset. See FIG. 8, step 860. In the above table A, for a carrier frequency of 700 MHz a timing drift of 10.7 ppm corresponds to a raster offset of 7,500 Hz.

Figure 9B:
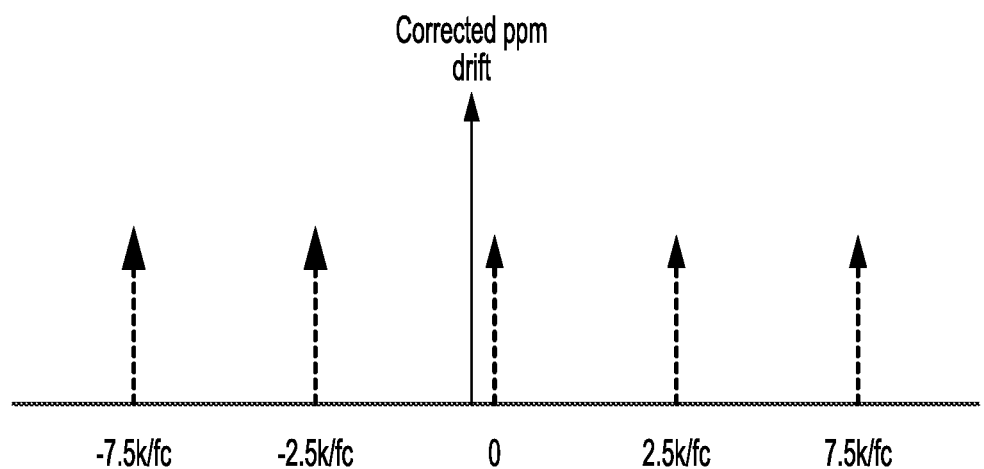
FIG. 9 B shows the corrected timing drift after the estimated raster offset has been corrected.

Negative of the drift values are to be used if raster offset is negative. Next, subtract the timing error using the raster offset which has a corresponding drift value closest to the estimated timing drift. See step 870 and FIG. 9B. FIG. 9 B shows the corrected timing drift after the estimated raster offset has been corrected. The UE can compensate timing drift for the frequency error from the clock source, excluding the overcompensation caused due to raster offset.

Once the raster offset is detected and corrected, the UE can perform better time tracking since the drift will be limited to approximately 0.2 ppm which will result in an improved NPBCH decoding.

Figure 10:
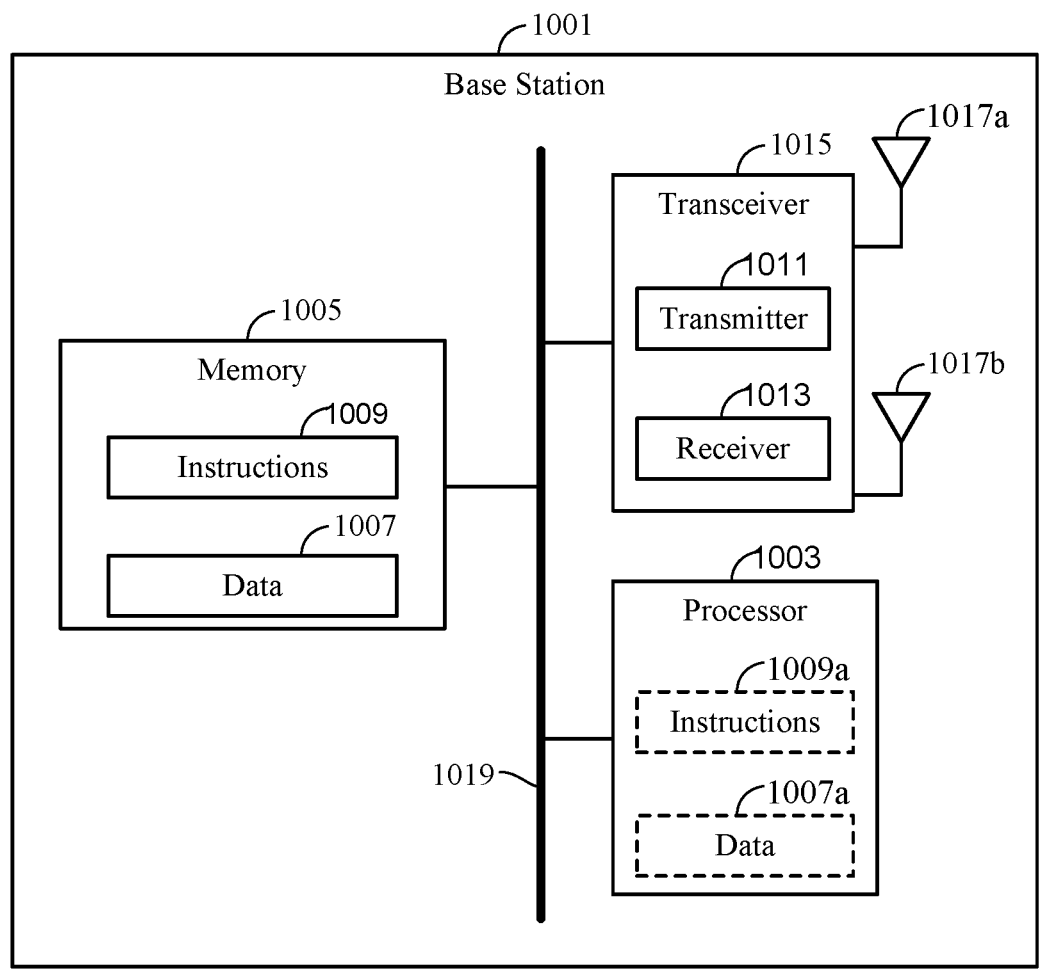
FIG. 10 illustrates certain components that may be included within a base station.

FIG. 10 illustrates certain components that may be included within a base station 1001. The base station 1001 may be an access point, a NodeB, an evolved NodeB, etc. The base station 1001 includes a processor 1003. The processor 1003 may be a general purpose single- or multi-chip microprocessor (e.g., an ARM), a special purpose microprocessor (e.g., a digital signal processor (DSP)), a microcontroller, a programmable gate array, etc. The processor 1003 may be referred to as a central processing unit (CPU). Although just a single processor 1003 is shown in the base station 1001 of FIG. 10, in an alternative configuration, a combination of processors (e.g., an ARM and DSP) could be used.

The base station 1001 also includes memory 1005. The memory 1005 may be any electronic component capable of storing electronic information. The memory 1005 may be embodied as random-access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1007 and instructions 1009 may be stored in the memory 1005. The instructions 1009 may be executable by the processor 1003 to implement the methods disclosed herein. Executing the instructions 1009 may involve the use of the data 1007 that is stored in the memory 1005. When the processor 1003 executes the instructions 1409, various portions of the instructions 1009a may be loaded onto the processor 1003, and various pieces of data 1007a may be loaded onto the processor 1003.

The base station 1001 may also include a transmitter 1011 and a receiver 1013 to allow transmission and reception of signals to and from the wireless device 1001. The transmitter 1011 and receiver 1013 may be collectively referred to as a transceiver 1015. Multiple antennas 1017*a-b* may be electrically coupled to the transceiver 1015. The base station 1001 may also include (not shown) multiple transmitters, multiple receivers and/or multiple transceivers.

The various components of the base station 1001 may be coupled together by one or more buses, which may include a power bus, a control signal bus, a status signal bus, a data bus, etc. For the sake of clarity, the various buses are illustrated in FIG. 10 as a bus system 1019. The functions described herein in the flowchart of FIG. 10, may be implemented in hardware, software executed by a processor like the processor 1003 described in FIG. 10.

Figure 11:
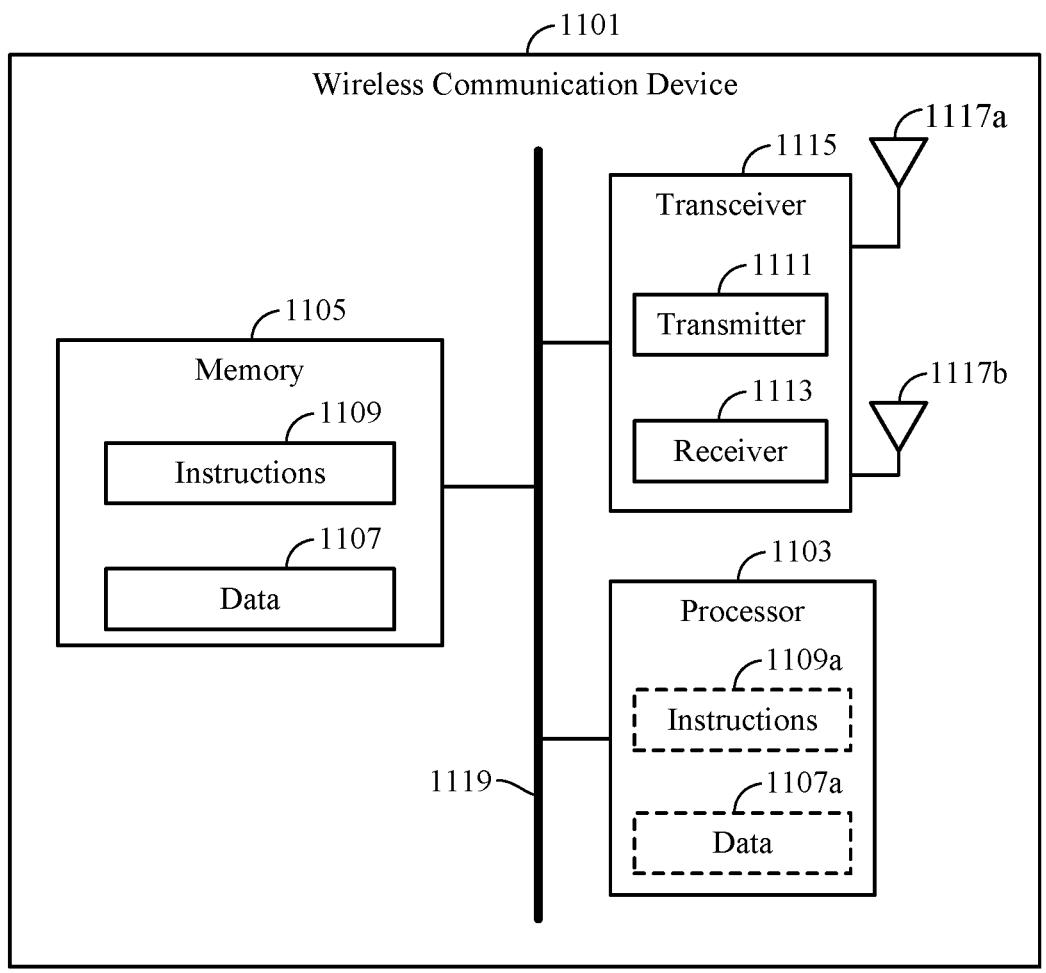
FIG. 11 illustrates certain components that may be included within a wireless communication device.

FIG. 11 illustrates certain components that may be included within a wireless communication device 1101. The wireless communication device 1101 may be an access terminal, a mobile station, a user equipment (UE), etc. The wireless communication device 1101 includes a processor 1103. The processor 1103 may be a general-purpose single- or multi-chip microprocessor (e.g., an ARM), a special purpose microprocessor (e.g., a digital signal processor (DSP)), a microcontroller, a programmable gate array, etc. The processor 1103 may be referred to as a central processing unit (CPU). Although just a single processor 1103 is shown in the wireless communication device 1101 of FIG. 11, in an alternative configuration, a combination of processors (e.g., an ARM and DSP) could be used.

The wireless communication device 1101 also includes memory 1105. The memory 1105 may be any electronic component capable of storing electronic information. The memory 1105 may be embodied as random-access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1107 and instructions 1109 may be stored in the memory 1105. The instructions 1109 may be executable by the processor 1103 to implement the methods disclosed herein. Executing the instructions 1109 may involve the use of the data 1107 that is stored in the memory 1105. When the processor 1103 executes the instructions 1109, various portions of the instructions 1109a may be loaded onto the processor 1103, and various pieces of data 1107a may be loaded onto the processor 1103.

The wireless communication device 1101 may also include a transmitter 1111 and a receiver 1113 to allow transmission and reception of signals to and from the wireless communication device 1101. The transmitter 1111 and receiver 1113 may be collectively referred to as a transceiver 1115. Multiple antennas 1117*a-b* may be electrically coupled to the transceiver 1115. The wireless communication device 1101 may also include (not shown) multiple transmitters, multiple receivers and/or multiple transceivers.

The various components of the wireless communication device 1101 may be coupled together by one or more buses, which may include a power bus, a control signal bus, a status signal bus, a data bus, etc. For the sake of clarity, the various buses are illustrated in FIG. 11 as a bus system 1119. It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for receiving on transmit and transmitting on receive.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical (PHY) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11 (wireless fidelity (Wi-Fi)), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 of FIG. 1 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for receiving on transmit and transmitting on receive. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method for reducing timing drift in a narrowband Internet-of-Things (NB-IoT) system, comprising:
    tracking, at a user equipment (UE), a timing error using a synchronization signal;
    computing, at the UE, a synchronization based time error estimate;
    estimating, at the UE, a timing drift based on the synchronization based time error estimate;
    mapping, at the UE, the estimated timing drift to a raster value based on a minimum distance criterion and a carrier frequency, the raster value corresponding to a drift value;
    determining, at the UE, a corrected timing drift based on the estimated timing drift and the drift value; and
    compensating, at the UE, for the corrected timing drift.

2. The method according to claim 1, wherein computing the synchronization based timing error comprises using a cross correlation operation on samples of the synchronization signal over a time duration T, and wherein T is an integer.

3. The method according to claim 2, wherein estimating the timing drift using the synchronization based time error estimate comprises:
    determining a difference in timing error from at least two instances of the synchronization signal separated by the time duration T; and
    dividing the difference in timing error by the time duration T, wherein the time duration T is a periodicity of the synchronization signal.

4. The method according to claim 2, wherein the time duration T is a periodicity of the synchronization signal.

5. The method according to claim 2, wherein different timing errors occur at multiple time instances during the cross correlation operation.

6. The method according to claim 1, wherein mapping the estimated timing drift to the raster offset comprises:
    determining one or more drift values corresponding to one or more possible values of raster offset closest to the estimated timing drift based on the minimum distance criterion;
    comparing the estimated timing drift to the one or more drift values corresponding to the one or more possible values of raster offset; and
    selecting the raster offset which has a corresponding drift value closest to the estimated timing drift.

7. The method according to claim 6, further comprising subtracting the drift value corresponding to the selected raster offset from the timing error.

8. The method of claim 1, wherein mapping the estimated timing drift to the raster value comprises selecting a particular predetermined drift value from a plurality of predetermined drift values that is closest to the estimated timing drift, wherein the plurality of predetermined drift values correspond to a plurality of predetermined raster values, and wherein the particular predetermined drift value corresponds to the raster value.

9. The method of claim 8, wherein a first predetermined drift value of the plurality of predetermined drift values corresponds to a first carrier frequency and a first predetermined raster value, wherein a second predetermined drift value of the plurality of predetermined drift values corresponds to a second carrier frequency and the first predetermined raster value, and wherein the first predetermined drift value is different from the second predetermined drift value.

10. The method of claim 1, wherein determining the corrected timing drift comprises subtracting the drift value from the estimated drift.

11. The method of claim 1, wherein compensating for the corrected timing drift comprises decoding a received signal based on a local oscillator signal and the corrected timing drift.

12. An apparatus for reducing timing drift in a narrowband Internet-of-Things (NB-IoT) system, comprising:
    means for tracking a timing error using a synchronization signal;
    means for computing a synchronization based time error estimate;
    means for estimating a timing drift based on the synchronization based time error estimate;
    means for mapping the estimated timing drift to a raster value based on a minimum distance criterion and a carrier frequency, the raster value corresponding to the drift value;

means for determining a corrected timing drift based on the estimated timing drift and the drift value; and means for compensating for the corrected timing drift.

13. The apparatus according to claim 12, wherein computing the synchronization based timing error comprises using a cross correlation operation on samples of the synchronization signal over a time duration T, and wherein T is an integer.

14. The apparatus according to claim 13, wherein estimating the timing drift using the synchronization based time error estimate comprises:

determining a difference in timing error from at least two instances of the synchronization signal separated by the time duration T; and dividing the difference in timing error by the time duration T, wherein the time duration T is a periodicity of the synchronization signal.

15. The apparatus according to claim 13, wherein the time duration T is a periodicity of the synchronization signal.

16. The apparatus according to claim 13, wherein different timing errors occur at multiple time instances during the cross correlation operation.

17. The apparatus according to claim 12, wherein mapping the estimated timing drift to the raster offset comprises:

determining one or more drift values corresponding to one or more possible values of raster offset closest to the estimated timing drift based on the minimum distance criterion;

comparing the estimated timing drift to the one or more drift values corresponding to the one or more possible values of raster offset; and selecting the raster offset which has a corresponding drift value closest to the estimated timing drift.

18. The apparatus according to claim 17, further comprising means for subtracting the drift value corresponding to the selected raster offset from the timing error.

19. A user equipment (UE) to reduce timing drift in a narrowband Internet-of-Things (NB-IoT) system, comprising:

a memory; and a processor coupled to the memory, the processor configured to:

track a timing error using a synchronization signal;

compute a synchronization based time error estimate;

estimate a timing drift based on the synchronization based time error estimate;

map the estimated timing drift to a raster value based on a minimum distance criterion and a carrier frequency, the raster value corresponding to a drift value;

determine a corrected timing drift based on the estimated timing drift and the drift value; and compensate for the corrected timing drift.

20. The UE according to claim 19, wherein the processor is further configured to compute the synchronization based timing error by using a cross correlation operation on samples of the synchronization signal over a time duration T.

21. The UE according to claim 20, wherein the processor is further configured to estimate the timing drift using the synchronization based time error estimate by:

determining a difference in timing error from at least two instances of the synchronization signal separated by the time duration T; and dividing the difference in timing error by the time duration T, wherein the time duration T is a periodicity of the synchronization signal.

22. The UE according to claim 20, wherein the time duration T is a periodicity of the synchronization signal.

23. The UE according to claim 20, wherein different timing errors occur at multiple time instances during the cross correlation operation.

24. The UE according to claim 19, wherein the processor is further configured to map the estimated timing drift to the raster offset by:

determining one or more drift values corresponding to one or more possible values of raster offset closest to the estimated timing drift based on the minimum distance criterion;

comparing the estimated timing drift to the one or more drift values corresponding to the one or more possible values of raster offset; and selecting the raster offset which has a corresponding drift value closest to the estimated timing drift.

25. The UE according to claim 24, wherein the processor is further configured to:

subtract the drift value corresponding to the selected raster offset from the timing error.

26. A non-transitory processor-readable storage medium having stored thereon processor-executable instructions configured to cause a processor of at least one user equipment to reduce timing drift in a narrowband Internet-of-Things (NB-IoT) system by performing operations comprising:

tracking a timing error using a synchronization signal;

computing a synchronization based time error estimate;

estimating a timing drift based on the synchronization based time error estimate;

mapping the estimated timing drift to a raster value based on a minimum distance criterion and a carrier frequency, the raster value corresponding to a drift value;

determining a corrected timing drift based on the estimated timing drift and the drift value; and compensating for the corrected timing drift.

27. The non-transitory processor-readable storage medium according to claim 26, wherein computing the synchronization based timing error comprises using a cross correlation operation on samples of the synchronization signal over a time duration T, and wherein T is an integer.

28. The non-transitory processor-readable storage medium according to claim 27, wherein estimating the timing drift using the synchronization based time error estimate comprises:

determining a difference in timing error from at least two instances of the synchronization signal separated by the time duration T; and divide the difference in timing error by the time duration T, wherein the time duration T is a periodicity of the synchronization signal.

29. The non-transitory processor-readable storage medium according to claim 27, wherein the time duration T is a periodicity of the synchronization signal.

30. The non-transitory processor-readable storage medium according to claim 27, wherein different timing errors occur at multiple time instances during the cross correlation operation.

* * * * *